May 5, 1970    E. M. PATTERSON    3,510,822
ELECTRICAL CONNECTORS
Filed Aug. 3, 1967    2 Sheets-Sheet 1

INVENTOR
Edmund M. Patterson
BY Strauch, Nolan, Neale, Nies & Kurz
ATTORNEYS

May 5, 1970  E. M. PATTERSON  3,510,822
ELECTRICAL CONNECTORS
Filed Aug. 3, 1967  2 Sheets-Sheet 2

INVENTOR
Edmund M. Patterson
BY Strauch, Nolan, Neale, Nies & Kurz
ATTORNEYS though other United States Patent Office
3,510,822
Patented May 5, 1970

---

3,510,822
ELECTRICAL CONNECTORS
Edmund M. Patterson, P.O. Box 291,
Somersworth, N.H. 03878
Filed Aug. 3, 1967, Ser. No. 658,217
Int. Cl. H01r *13/34, 17/08*
U.S. Cl. 339—14     5 Claims

ABSTRACT OF THE DISCLOSURE

Junction boxes or like assemblies for connecting electrical wires in which an insulated body has a plurality of guide openings into which the wires to be connected are inserted and are guided to the point of connection where they are joined by one or more externally accessible fasteners. The insulated body is provided with bayonet type fittings for detachable connection to a switch assembly or wall outlet fixture.

BACKGROUND OF THE INVENTION

The present invention relates to junction boxes or like devices for connecting electrical wires, one to the other, or to a switch or a wall outlet fixture or similar device. While the invention is of broad utility, it has particular application to the wiring of buildings, particularly domestic dwellings.

Techniques of wiring buildings have continued without substantial change for many years. Improvements in individual components such as cables, switches and controls have not been accompanied by corresponding improvements in wiring techniques which continue to be awkward, expensive and time consuming.

In accordance with long existing conventional practice, electrical wires are connected in junction boxes or outlet boxes which are installed on studding prior to the application of the final wall covering. Wires are led into opposite sides of the junction box and are initially left disconnected. Then, after the application of the final wall covering, such as plaster or wall board, the switches or outlets are installed in the boxes.

At present, most buildings are wired with a three wire system and it is frequently necessary to run four three-wire cables into a junction box which requires the stripping and connection of 12 individual wires. To prepare the wires for connection, it is necessary to strip the main cable and then strip the ends of the individual wires. The stripped ends of the wires must then be brought out of the junction box to permit their connection to the switch or wall plug to be installed in the junction box. The ends of the wires must be bent and fastened by individual screws to the switch or plug, then the plug or switch must be forced back into the junction box requiring the bending, twisting or folding of the excess, relatively heavy cable within the confines of the junction box. This is an extremely awkward, time consuming operation and inherently involves the possibility of breaking insulation or loosening prior connections with the attendant possibility of an open circuit or a dangerous short circuit.

In addition, before the final connections are made it is often necessary to retrace the entire circuit to assure the accuracy of the individual connections. The problem has been magnified by the rapidly increasing cost of labor as well as increasing demand for extra convenience outlets. At present, for example, the average small home requires twenty to twenty-five double outlets and six to ten single pole switches.

Prior efforts to solve this problem have not been successful and none have met with any appreciable commercial success. Typical examples of such prior efforts are reflected in U.S. Pats. 2,463,033; 2,533,673; 2,699,-533; 2,808,449; 2,917,724; 3,038,141 and 3,218,596. As far as is presently known, none of these devices have found acceptance either because of their complexity, high cost or lack of versatility.

SUMMARY OF THE INVENTION

With these considerations in mind, important objects of the present invention are to provide improved junction boxes which eliminate all of the foregoing problems and disadvantages associated with conventional wiring techniques, which substantially reduce the overall cost of wiring, which materially reduce the likelihood of wiring errors and the possibility of opens or shorts in the circuit, and which are of essentially universal application.

In attaining these and other objects, the present invention provides a unique junction box comprising the usual metallic box for mounting on studding and a non-metallic connector block insert for permanent installation in the box. The insert, which may be of one piece or of multi-layer construction, has a plurality of guide bores into which the individual wires entering the junction box are inserted after being stripped at their ends. The stripped ends of the wires are automatically guided in three dimensions to connector points where they automatically meet the stripped ends of the wires of the other cables to which they are to be connected. Thus, the wires may all be installed by simply pushing them in straight line motion to a limit position. The final connection is made by tightening screws which are readily accessible from the open front face of the junction box. Thus, substantially all bending, taping and soldering of the wire connections is eliminated. The possibility of a loose connection, damage to the cable, short circuit or wiring error is also substantially eliminated.

In accordance with another important aspect of the invention, a non-metallic insert is provided with male bayonet type fittings, preferably the fasteners which connect the wires together, and a plug or switch with corresponding fittings which permit the installation of a plug or switch by simply snapping it in place.

Additional objects and advantages will become apparent as the description proceeds in connection with the accompanying drawings.

THE DRAWINGS

Figure 10:
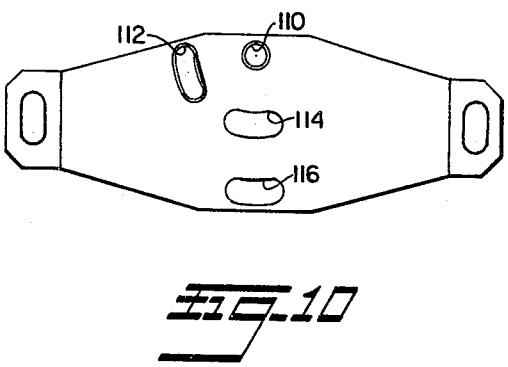
Figure 7:
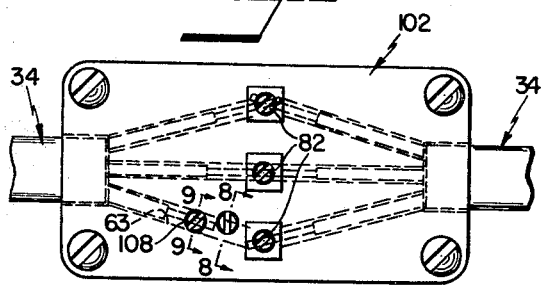
FIG. 7 is a top plan view of another embodiment of the connector block insert.
Figures 8, 9:
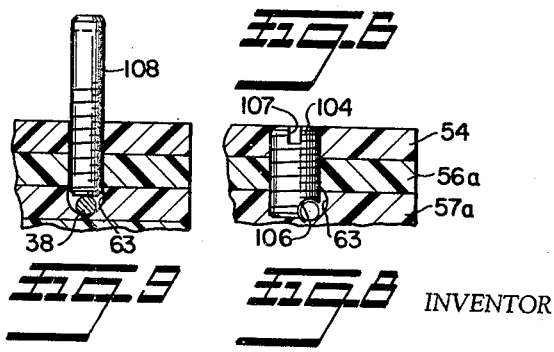

FIGS. 8 and 9 are enlarged fragmentary sections taken along lines 8—8 and 9—9, respectively, of FIG. 7; and FIG. 10 is a bottom plan view of a switch assembly for use with the connector block of FIG. 7.

PREFERRED EMBODIMENTS

Figure 1:
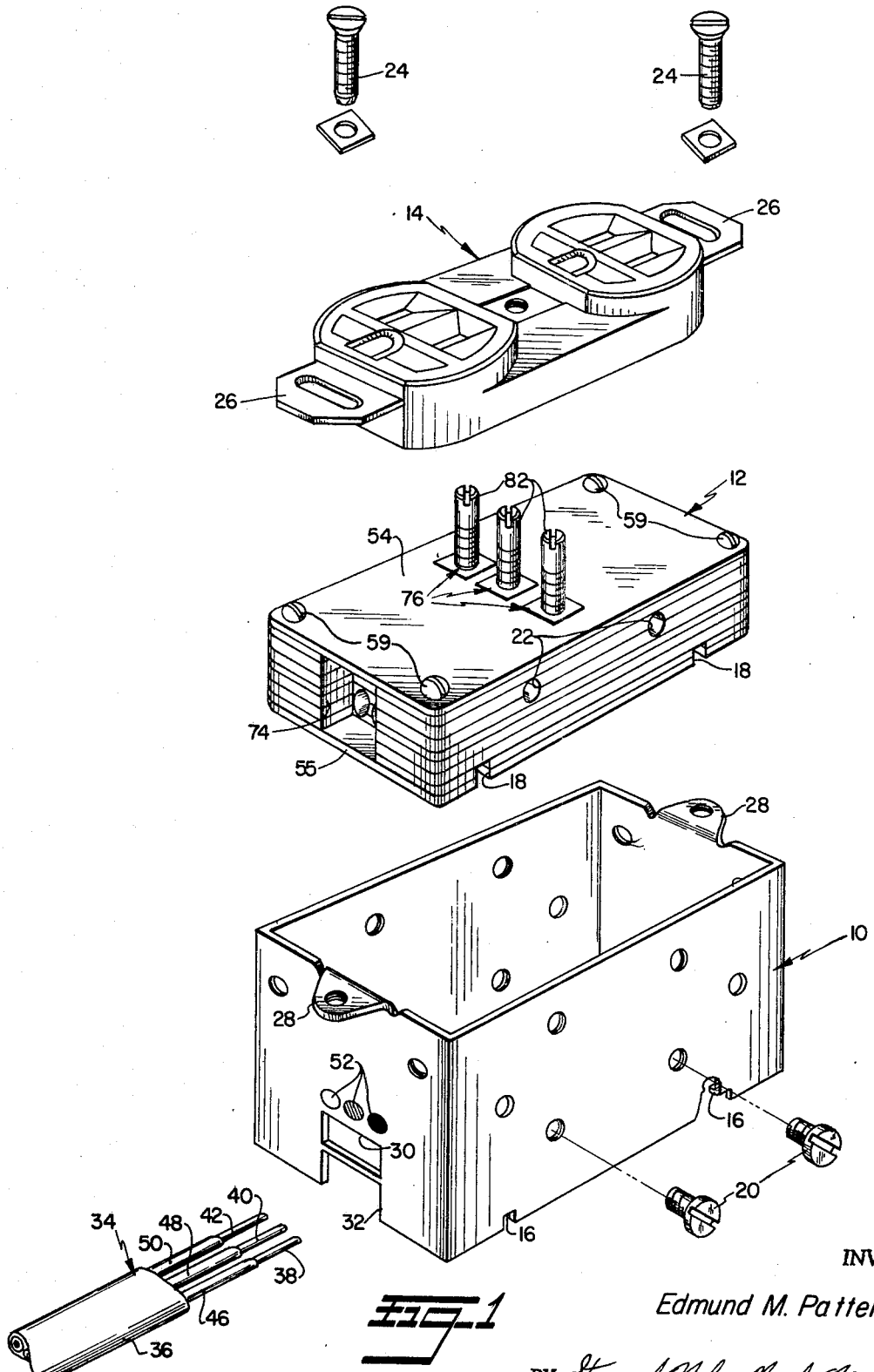
FIG. 1 is an exploded view showing the principal components of one embodiment of the present invention including the metallic junction box, the non-metallic connector block insert and a double outlet.

With continuing reference to the drawings, and particularly FIG. 1, the principal components of the invention include an essentially rectangular junction box 10 having an open top and bottom, the connector block insert assembly 12 and the outlet fitting 14. The box assembly 10 is preferably formed of sheet metal in accordance with conventional techniques. The connector block 12 is adapted to be fitted snugly within the box 10, the insert being held against passage through the bottom of the box by tabs 16 which are struck inwardly from the sides of the box 10 and fit within recesses 18 in the insert. Preferably, the connector block is retained in place by one or more screws 20 threaded through a side wall of the box 10 into corresponding recesses 22 provided in the side wall or walls of the insert 12.

As explained in detail below the fitting 14 is adapted to be snapped into place in engagement with connectors on the assembly 12 and is fastened in place by a pair of screws 24 extending through the usual end flanges 26 on the fitting 14 and into threaded openings on ears 28 projecting outwardly from the end walls of the box 10.

The end walls of the box 10 are provided with openings 30 and 32 (corresponding openings being provided in the opposite end wall) for the reception of a standard three wire cable of the type indicated generally at 34. This cable comprises outer insulating cover 36, housing three wires 38, 40 and 42 encased in individual insulated covers 46, 48 and 50, respectively. In accordance with conventional practice the wires are color coded, for example, the insulation 46 will be black to indicate the hot line, the insulation 48 will be colored green to indicate the grounding wire and the insulation 50 will be white to indicate the common line or main ground. To indicate the proper orientation to the wire before installation in the box 10, color coding may be provided on the end face of the box, for example, as by colored dots 52.

Figure 3:
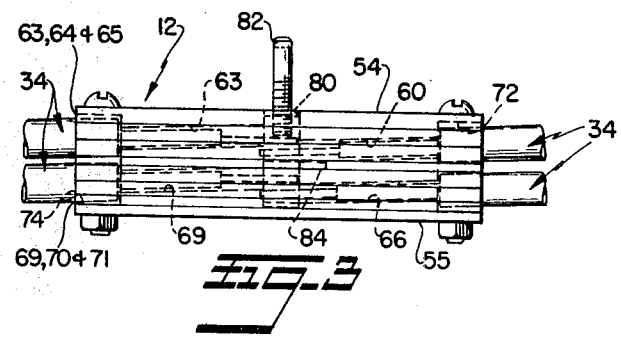
FIGURE 3 is a side elevation of the insert shown removed from the junction box.
Figure 4:
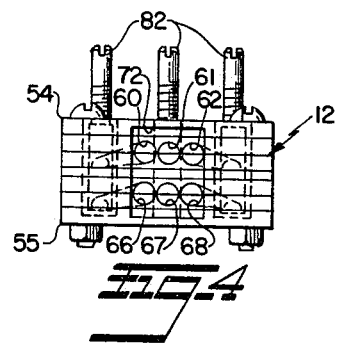
FIG. 4 is an end view of the insert.

In the illustrated embodiment, connector assembly 12 is of laminated construction, although it is to be understood that it may be of one or two piece molded construction. As illustrated, the assembly comprises top and bottom cover plates 54 and 55, respectively. The main body of the connector assembly comprises upper and lower sections A and B of essentially identical construction, each section being adapted to receive two of the three wire cables 34. The upper section comprises layers 56a, 57a and 58a and the lower section comprises corresponding layers 56b, 57b and 58b. The various layers as well as the top and bottom plates are secured together by screws or rivets 59. The layers 56a, 57a and 58a cooperate to form six guide channels 60–65 in the section A and the lower layers 56b, 57b and 58b cooperate to form six smaller channels 66–71 in the lower section B. Each of the channels extends from one end of the block 12 to its midpoint. The center channels 61, 64, 67, and 70 extend centrally through the block 12 whereas the outer channels diverge outwardly. The channels 60, 61 and 62, as shown in FIG. 3, are inclined downwardly whereas the channels 63, 64 and 65 are inclined upwardly so that at their inner ends they are vertically offset by an amount approximately equal to the gauge of the wires to be connected. The various guide channels in the lower section B are arranged in similar fashion.

Figure 5:
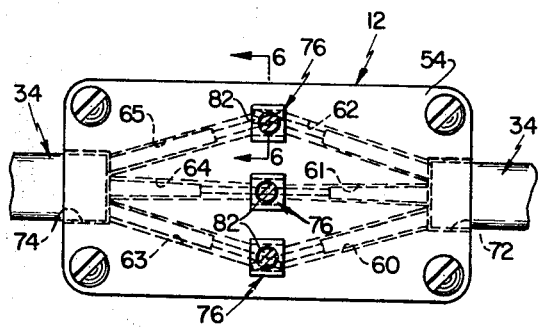
FIG. 5 is a top plan view of the insert.

At their outer ends, the channels terminate in an enlarged opening 72 or 74 of sufficient size to accommodate the entire body of the cable 34. The channels 60–71 are of sufficient size to accommodate the individual wires 38, 40 or 42 with their insulating coverings 46, 48 or 50. Thus, when the cables are installed as shown in FIGS. 3 and 5, at each channel intersection the stripped ends of two wires extend one over the other.

Figure 6:
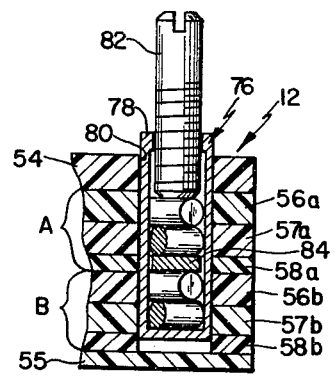
FIG. 6 is an enlarged fragmentary section taken along line 6—6 of FIG. 5 showing details of one point of connection of the wires.

Identical fastener or connector assemblies, indicated generally at 76, are provided for the respective sets of black wires, green wires and white wires. As best shown in FIG. 6 these fasteners each comprise a small rectangular open-ended frame 78 slidably received in a rectangular aperture 80 extending through the block 12 except for the bottom cover member 55. A screw 82 is threaded into the upper end of the frame member 78 for engagement with the uppermost one of the wires of the channel intersection in which the frame 78 is installed. The upper and lower pairs of wire ends are separated by a plate 84 which extends freely through the frame assembly 78 and is held against vertical movement in a slot (not shown) in the layer 58a of the upper insert section A.

Thus, when the wires are installed as shown in FIGURE 6 and the screw is tightened, the upper pair of wires will be forced against the upper surface of the plate 84 and continued tightening of the screw 82 will raise the frame assembly 78 to force the lower pair of wires into tight engagement with each other between the plate 84 and the bottom surface of the frame 78. Thus, by simply tightening the three screws 82 the desired contacts are made securely and firmly between all 12 wires entering the junction box. It is to be understood that the cables entering the right side of the unit as viewed, for example, in FIG. 5 are inverted with respect to those entering from the left side so that all of the black wires will be fed to one of the connectors, all of the white wires will be fed to another of the connectors and all of the green wires will be fed to the third connector.

The three screws 82 not only establish electrical contact between the various wires, but are themselves in electrical contact with the wires and thus form conducting posts.

Figure 2:
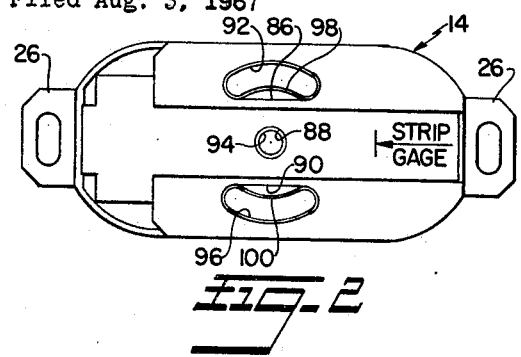
FIG. 2 is a rear elevation of the outlet member.

In accordance with the invention, the screw posts 82 are used to provide a mounting and electrical connection to a fitting such as the double plug fitting assembly shown in FIGS. 1 and 2. As shown in the latter figure the underside of the fitting 14 is provided with three openings 86. 88 and 90, each lined with an electrical contactor 92, 94 and 96. Conveniently the central opening 88 and the liner 94 are circular and slide over the central one of the screws 82 with a snug fit. The outermost openings 86 and 90 are of generally arcuate form and the conducting liners are resilient strips, each having a bowed portion, 98 and 100, out of contact with the adjacent portion of the opening 86 or 90 to assure firm electrical contact between the outermost posts 82 and the conducting liners 92 and 96. It will be understood that the conductors 92, 94 and 96 are connected in conventional manner by internal wiring to the actual receptacle portions of the fitting 14. Since this wiring is conventional it has been omitted for clarity.

Thus, after the screws 82 have been tightened, the fitting 14 may be installed by simply slipping it over the posts 82 and attaching it to the junction box 10 by the screws 24. Proper alignment of the fixture 14 is permitted by the elongation of the openings through which the screws 24 pass and by the curvature and elongation of the openings 86 and 90.

The invention is incorporated in a wiring system by first attaching the box 10, containing the connector block 12 to the wall studding or other wall support in conventional manner by nails or screws. The main cable and the individual wires are then stripped as shown in FIGS. 1, 3 and 5, preferably with the aid of a stripping gauge preferably provided on the box 10. The stripped cable ends are then inserted into the junction box in straight-line motion until they reach a limit position which automatically disposes the stripped ends of the individual wires within the appropriate fastener assemblies 76. The three screws 82 may then be tightened. Installation of the wall plug fitting 14 is deferred until the final wall covering has been applied. It is then simply slipped in place properly oriented, and fastened securely in position by tightening the two screws 24. Thus, the cumbersome, awkward and time consuming manipulation of the wires themselves and the bending and folding of the wires into the junction box are eliminated by the present invention. Also, since the wires are all electrically connected at the time of their original installation it is never necessary to perform the time consuming task of retracing the electrical circuit before the final connections are made.

It will be noted that there are no exposed parts of the block 12 which are susceptible to damage or the accumulation of dirt during the application of the final wall cover. At most, it may be necessary to wipe or clean the projecting ends of the screws 82 to permit installation of the wall plug fitting.

The present invention may also be readily adapted for use with a single pole switch or a combination outlet and single pole switch. A suitably modified construction is illustrated in FIGS. 7, 8, 9 and 10 to which detailed reference will now be made. The connector assembly 102 of FIG. 7 is essentilaly the same as the assembly previously described except for the accommodation and connection of the black or hot wires. It is, of course, necessary that the connection through the hot wires be made or broken only through the switch assembly. Thus, the connection of the hot wires through the block 102 must be positively prevented. For this purpose a non-metallic blocking screw 104 is threaded into the upper surface of the assembly and intersects the channel 63 through which one of the black or hot leads (for example line 38) extends. As shown in FIG. 8 the screw 104 is provided with a groove 106 (aligned with kerf 107) which, by rotation of the screw, may be moved into or out of registry with the channel 63. When the groove is in registry with the channel the wire may pass through the channel to the connector assembly 76 to permit use of the assembly 102 in the same manner as the assembly 12. When the screw is rotated 90° the channel 63 is blocked and the connection through the hot leads is interrupted. The connection to the blocked lead is provided through a conducting screw 108, the bottom end of which is adapted to engage the wire 38 in the channel 63 and the upper end of which is adapted to function as a connector post like screws 82.

The switch assembly of FIG. 10, which is adapted for snap-in installation in the assembly of FIG. 7 is conventional except for the fact that the normal screw type connections have been omitted and conducting female sockets 110 and 112 are provided which slip over the projecting end of the screw 82 at the normal hot lead junction and the end of the screw 108. Additional openings 114 and 116 may be provided to accommodate the additional screws 82.

Similarly, a combination outlet and single pole switch can be accommodated by the assembly of FIG. 7 by simply providing a conventional unit modified by the installation of female connectors to receive all four connector screws provided in the unit of FIG. 7.

It is also to be understood that the present invention may be readily adapted for the handling of two or four wire systems by increasing or decreasing the number of channels and the connector posts and assemblies. Also two or three cables 34 may be connected through block 12. Normally the end openings of all wire channels are closed by removable plastic plugs (not shown) preferably included in the unit as sold. The plugs will be left in place except where they are removed to permit the installation of wires. The invention may be readily adapted for use with wall plug or switch assemblies of conventional construction by using short wire lengths either connected to the screws 82 or to fittings connected to the screws.

Also to permit disconnection of one or more of the cables 34, the intermediate laminations 56, 57 and 58 may be shortened as compared to the top and bottom cover plates to form pockets into which the wire ends may be folded.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. Connector assembly for connecting electrical cables, each having three wires arranged in laterally spaced relation, comprising means forming a first set of guide channels in said connector assembly extending from one outer surface thereof toward separate junction points, there being one guide channel for each wire in one of said cables, means forming a second set of guide channels in said connector assembly extending from another outer surface thereof towards said junction points, there being one guide channel for each wire of another of said cables one of said channels in each set extending centrally of said connector assembly and the remaining channels of each set diverging outwardly toward the edges of said connector assembly, and said guide channels being constructed and arranged to dispose the portions of the wires inserted therethrough in overlapping relations at said junction points, and means accessible from the exterior of said assembly for connecting said wires at said junction points.

2. Connector assembly for connecting electrical cables having a plurality of individual wires comprising means forming a first set of guide channels in said connector assembly extending continuously from one outer surface thereof to separate junction points, there being one guide channel for each wire in one of said cables, means forming a second set of guide channels in said connector assembly extending continuously from another outer surface thereof to said junction points, there being one guide channel for each wire of another of said cables, said first and second sets of guide channels permitting insertion of the cables into the connector by endwise movement of the cables and the inner ends of the respective channels being offset to dispose the portions of the wires inserted therethrough in overlapping relation at said junction points, and means accessible from the exterior of said assembly for connecting said wires at said junction points.

3. The connector assembly according to claim 2 together with a wire fastener assembly at each junction point, said fastener assembly comprising a frame in which said superposed portions of said wires are disposed, and a screw threaded into said frame and having an inner end engageable with said wires and an outer end projecting outwardly of said connector assembly.

4. The assembly according to claim 3 together with a wall plug fitting having conductive sockets adapted to fit over the projecting portions of said screws in electrical contact therewith to thereby electrically connect said fitting to said wires.

5. The assembly according to claim 3 together with a switch assembly having conducting sockets adapted to receive the projecting portions of certain of said screws to place said switch assembly in electrical contact with certain of said wires.

References Cited

UNITED STATES PATENTS

| 2,433,917 | 1/1948 | McCartney | 174—53 |
| 2,597,070 | 5/1952 | Cook et al. | |
| 3,038,141 | 6/1962 | Chiucholo | 174—53 XR |

FOREIGN PATENTS

| 493,463 | 5/1950 | Belgium. |
| 343,719 | 2/1931 | Great Britain. |

MARVIN A. CHAMPION, Primary Examiner

P. A. CLIFFORD, Assistant Examiner

U.S. Cl. X.R.

174—153; 339—113, 156, 164, 198